(12) United States Patent  
Cheng (10) Patent No.: US 8,477,386 B2  
(45) Date of Patent: Jul. 2, 2013

(54) COVER-TYPE APPARATUS WITH SIMPLIFIED INTERLOCKING STRUCTURE

(75) Inventor: Sung-Po Cheng, Hsinchu (TW)

(73) Assignee: Avision Inc. (TW)

(*) Notice: Subject to any disclaimer, the term of this patent is extended or adjusted under 35 U.S.C. 154(b) by 345 days.

(21) Appl. No.: 12/897,317

(22) Filed: Oct. 4, 2010

(65) Prior Publication Data

US 2011/0083372 A1    Apr. 14, 2011

(30) Foreign Application Priority Data

Oct. 13, 2009    (TW) .............................. 98134568 A (51) Int. Cl.  
*H04N 1/04*    (2006.01)

(52) U.S. Cl.  
USPC ........... 358/474; 358/496; 358/498; 358/501; 271/264; 271/117; 399/107

(58) Field of Classification Search  
USPC .. 358/498, 488, 474, 496, 501, 406; 271/264, 271/117, 10.04, 10.01, 10.09, 226, 18, 109; 399/107, 367, 110  
See application file for complete search history.

(56) References Cited

U.S. PATENT DOCUMENTS

| | | | |
|---|---|---|---|
| 5,887,866 A * | 3/1999 | Yamauchi et al. | 271/116 |
| 6,882,822 B2 * | 4/2005 | Gomi et al. | 399/380 |
| 7,429,039 B2 * | 9/2008 | Hattori et al. | 271/10.01 |
| 7,515,854 B2 * | 4/2009 | Kawai | 399/258 |
| 7,536,148 B2 * | 5/2009 | Fukumura | 399/367 |
| 7,669,968 B2 * | 3/2010 | Umeda | 347/49 |
| 7,673,985 B2 * | 3/2010 | Sasa | 347/104 |
| 7,733,540 B2 * | 6/2010 | Moribe | 358/474 |
| 7,784,906 B2 * | 8/2010 | Umeda | 347/49 |
| 7,822,362 B2 * | 10/2010 | Watanabe et al. | 399/125 |
| 7,982,923 B2 * | 7/2011 | Andoh et al. | 358/474 |
| 8,041,283 B2 * | 10/2011 | Murai | 399/367 |
| 8,120,821 B2 * | 2/2012 | Ishida et al. | 358/474 |
| 8,154,770 B2 * | 4/2012 | Shiraki et al. | 358/401 |
| 8,244,167 B2 * | 8/2012 | Andoh et al. | 399/381 |
| 8,279,495 B2 * | 10/2012 | Andoh et al. | 358/471 |
| 2007/0002396 A1 * | 1/2007 | Naruse | 358/474 |

* cited by examiner

*Primary Examiner* — Negussie Worku (57) ABSTRACT

A cover-type apparatus with a simplified locking structure includes a first body, a second body and an interlocking mechanism for fastening the second body and the first body together. The interlocking mechanism includes a hook disposed on the first body, and an elastic member disposed on the second body and being engageable with the hook. The elastic member deforms elastically in response to a force exerted thereon by the hook.

15 Claims, 11 Drawing Sheets

COVER-TYPE APPARATUS WITH SIMPLIFIED INTERLOCKING STRUCTURE

This application claims priority of No. 098134568 filed in Taiwan R.O.C. on Oct. 13, 2009 under 35 USC 119, the entire content of which is hereby incorporated by reference.

BACKGROUND OF THE INVENTION

1. Field of the Invention

The invention relates to a cover-type apparatus, and more particularly to a cover-type apparatus with a simplified interlocking structure.

2. Related Art

In a conventional automatic sheet feeder of a scanner or a sheet-fed scanner, a latching mechanism is provided to fasten the cover to the body of the scanner. The latching mechanism may include a rotating shaft mounted on the cover and two hooks disposed at two ends of the rotating shaft. Each of the hooks engages with a recess on a body of the scanner, so that the cover is locked to the body. In addition, the latching mechanism may also include a releasing handle, which, when being pressed, rotates the hooks upwards to unlatch the hooks from the recess, and the cover is released. A biasing spring may be disposed to provide a restoring force to the latching mechanism.

Thus, such latching mechanism is composed of many components, and it is time consuming and labor consuming to assemble so many components. In addition, the tolerance and the yield rate of each of the components affect the assembly quality and stability of the cover and the scanner. Furthermore, the assembly of the scanner of the prior art has to rely on dedicated jigs and tools. As a result, the manufacturing costs of the conventional scanner cannot be reduced.

SUMMARY OF THE INVENTION

It is therefore an object of the invention to provide a cover-type apparatus, which has a simplified interlocking structure and can be frequently used for a long time. The cover-type apparatus may be applied to an apparatus such as a scanner, a printer, a multi-function peripheral or the like.

To achieve the above-identified object, the invention provides a cover-type apparatus including a first body, a second body and an interlocking mechanism. The interlocking mechanism fastens the second body and the first body together, and includes a hook mounted on the first body and an elastic member mounted on the second body and being engageable with the hook. The elastic member deforms elastically in response to a force exerted thereon by the hook.

Thus, with such configuration, the interlocking structure is simplified, the number of components used in the cover-type apparatus is reduced, and the lifetime of the interlocking mechanism may be lengthened by using the highly accessible metallic elastic member.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
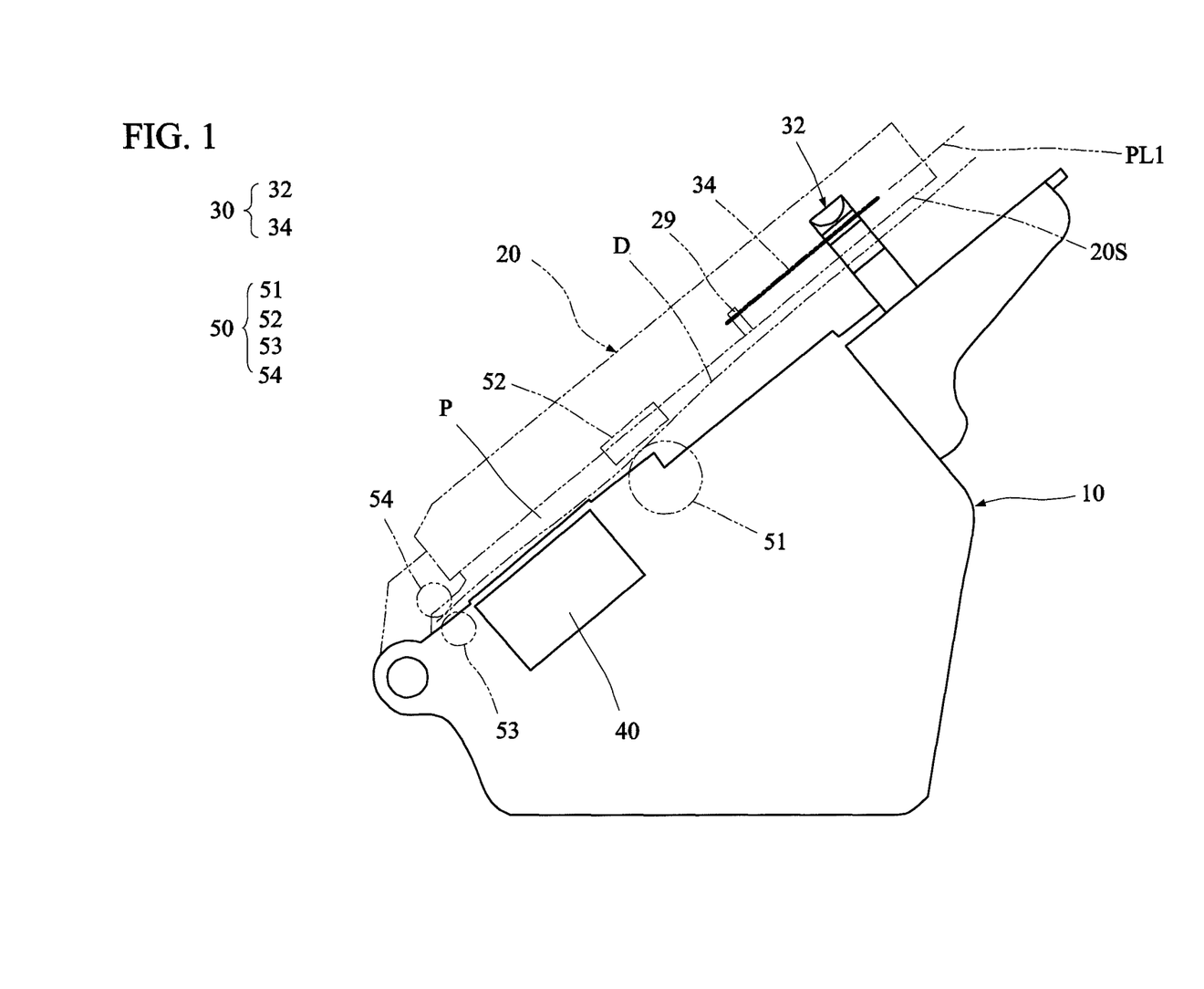
FIGS. 1 and 2 are side views respectively showing two states of a cover-type apparatus according to the invention.
Figure 2:
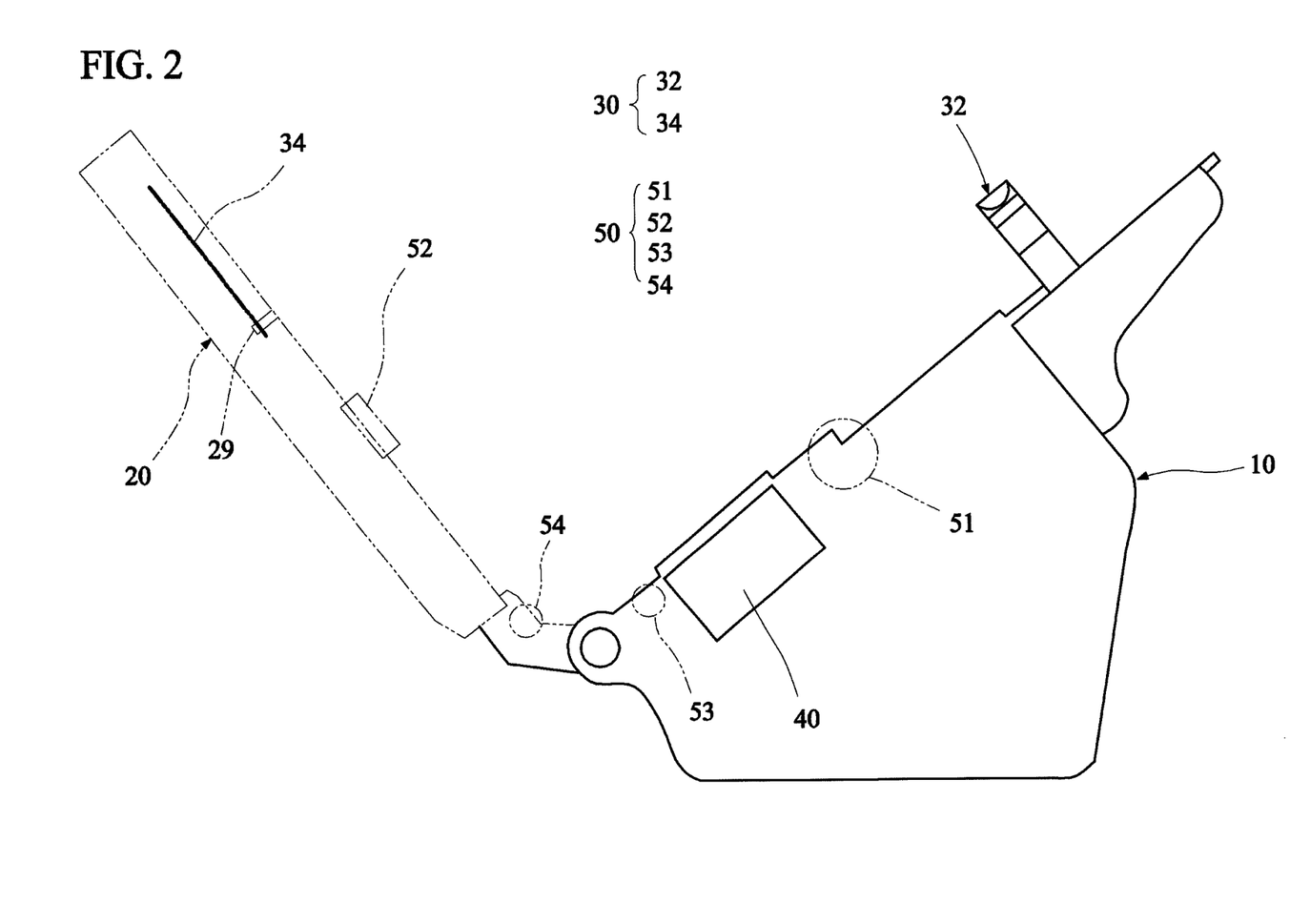

FIGS. 1 and 2 are side views respectively showing two states of a cover-type apparatus according to the invention. Referring to FIGS. 1 and 2, the cover-type apparatus of the invention includes a first body 10, a second body 20 and an interlocking mechanism 30. The second body 20 is rotatably supported on the first body 10 and the second body 20 is openable and closable with respect to the first body 10. With such design, users may easily open up the second body 20 for the purpose of maintenance or to eliminate common breakdowns. In this embodiment, the cover-type apparatus may be applied to a sheet-fed scanner. The first body 10 and the second body 20 may be an upper housing and a lower base of the sheet-fed scanner, respectively, or may be the lower base and the upper housing of the sheet-fed scanner, respectively.

In the present invention, the cover-type apparatus may further include a scanning module 40 and a sheet transporting mechanism 50. The scanning module 40 is disposed in the first body 10. The sheet transporting mechanism 50, disposed in the first body 10 and the second body 20, transports one document D or multiple documents D past the scanning module 40. The scanning module 40 captures an image of the document D being transported. The sheet transporting mechanism 50 includes a feeding roller 51, a friction pad 52 and two discharge rollers 53 and 54. The feeding roller 51 is mounted on the first body 10. The friction pad 52, mounted on the second body 20 and in frictional contact with the feeding roller 51, transports the document D into a passageway P between the first body 10 and the second body 20. The two discharge rollers 53 and 54, respectively mounted on the first body 10 and the second body 20, transports the document D out of the passageway P.

The interlocking mechanism 30, for fastening the second body 20 and the first body 10 together, includes a hook 32 and an elastic member 34. The hook 32 may have one single hooking structure or multiple hooking structures. The hook 32 is mounted on the first body 10. The elastic member 34 is mounted on the second body 20 and is engageable with the hook 32. When the second body 20 is closed upon the first body 10, the hook 32 hooks the elastic member 34 to fasten the second body 20 to the first body 10. In the process, the elastic member 34 and the hook 32 are interlocking with or disengaging from each other, the elastic member 34 deforms elastically in response to the force exerted by the hook 32, and the elastic member 34 deforms in a plane PL1 substantially parallel to a surface 20S of the second body 20 disposed opposite the first body 10. In this embodiment, the elastic member 34 is formed of metal and the elastic member 34 is preferably a metal wire in a bent shape. Although a particular type of material of the elastic member 34 is described, those skilled in the art will realize that materials other than metal can also be used. The deforming states of the elastic member 34 are similar to those shown in FIGS. 7 to 10, and will be described in the following.

Figure 3:
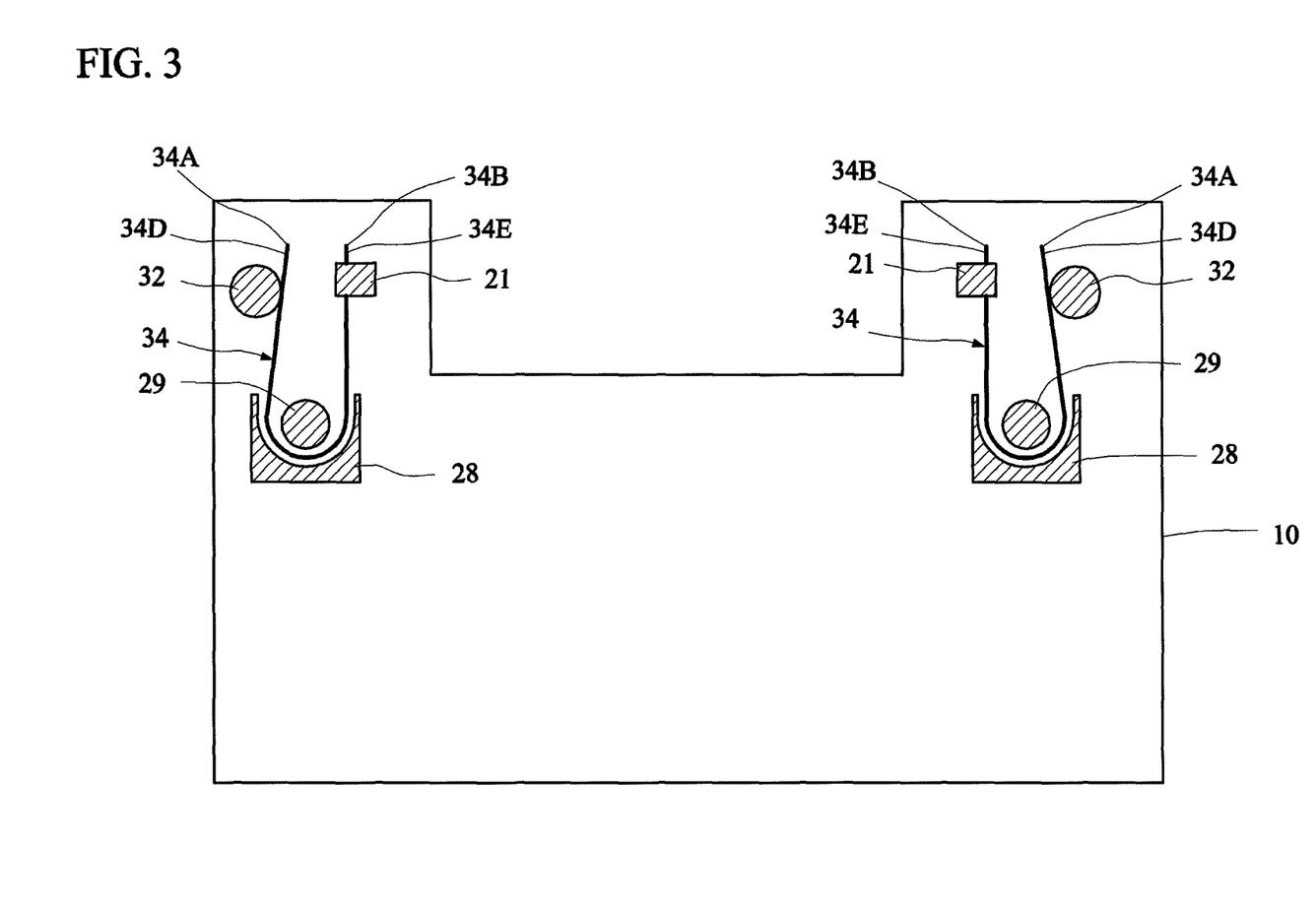
FIGS. 3 and 4 are front views respectively showing two states of an example of an interlocking mechanism according to the invention.
Figure 4:
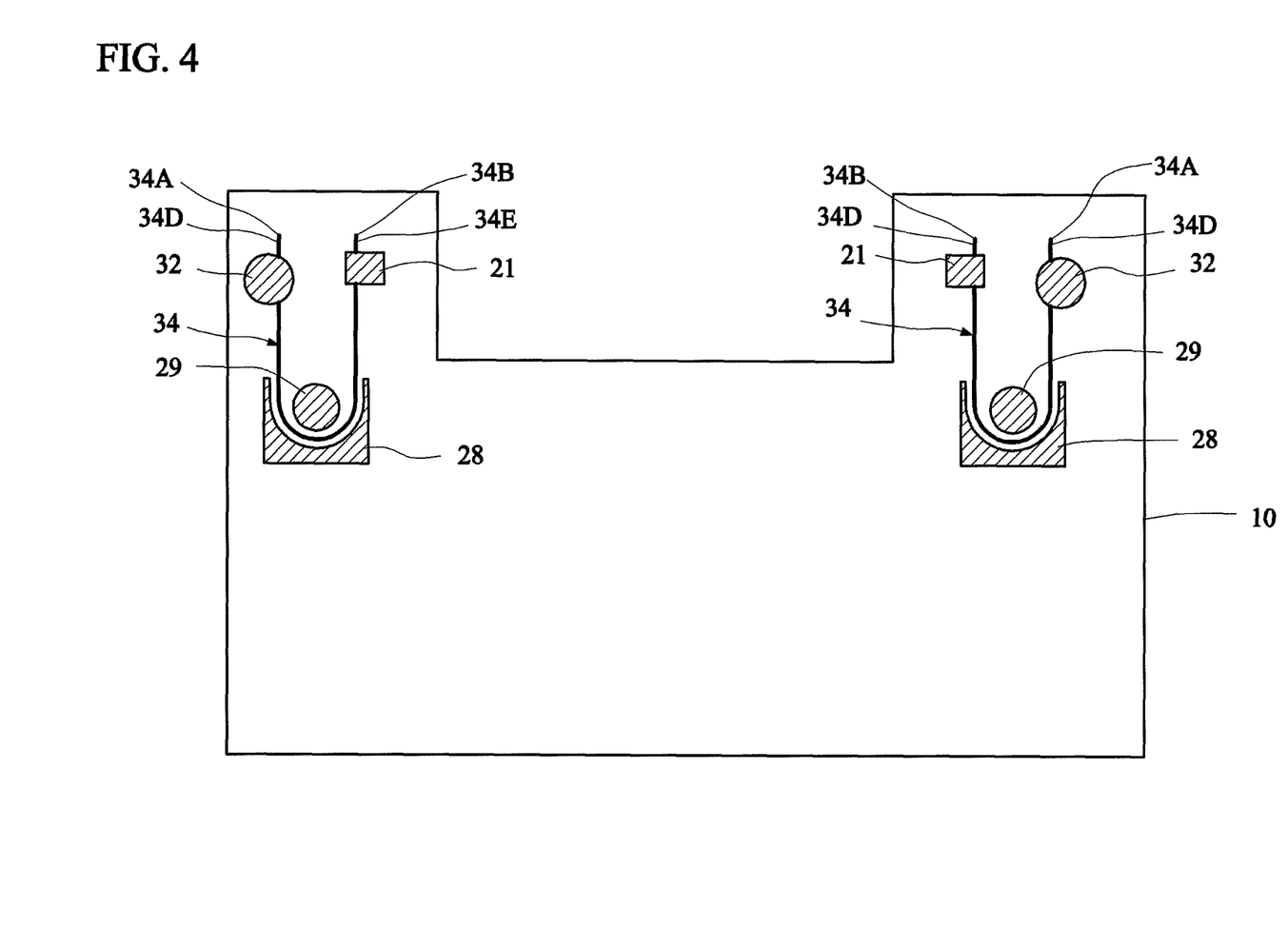

FIGS. 3 and 4 are front views respectively showing two states of an example of an interlocking mechanism according to the invention. Referring to FIGS. 3 and 4, the elastic member 34 is formed in a curved shape, where a first end 34A and a second end 34B of the elastic member 34 are fixed to the second body 20 through, for example, a block 28 and a pin 29.

FIG. 3 shows the deformation of the elastic member 34, as the elastic member 34 is interlocking with or disengaging from the hook 32. The hook 32, mounted on the first body 10, hooks a first section 34D near the first end 34A from the outer side of the elastic member 34. In response to the force exerted by the hook 32, the first section 34D of the elastic member 34 deforms elastically towards the inner side of the elastic member 34. As the hook 32 is disengaging from the elastic member 34, the first section 34D also deforms elastically towards the inner side of the elastic member 34 in response to the force exerted by the hook 32. The detailed structure of the hook 32 will be described in the following.

FIG. 4 shows the state when the elastic member 34 and the hook 32 are interlocked together. The first section 34D of the elastic member 34 restores to its original position through its own elastic restoring force, and tightly interlocks with the hook 32, so that the first body 10 and the second body 20 are fastened together. In this embodiment, a second section 34E of the elastic member 34 is immovable and fixed to a retainer 21 disposed on the second body 20. In this embodiment, only one hook is described. In practice, however, the interlocking mechanism is not limited thereto, and two such hooks may also be employed to hook the elastic member 34 from the outer sides of the first section 34D and the second section 34E of the elastic member 34, respectively.

Figure 5:
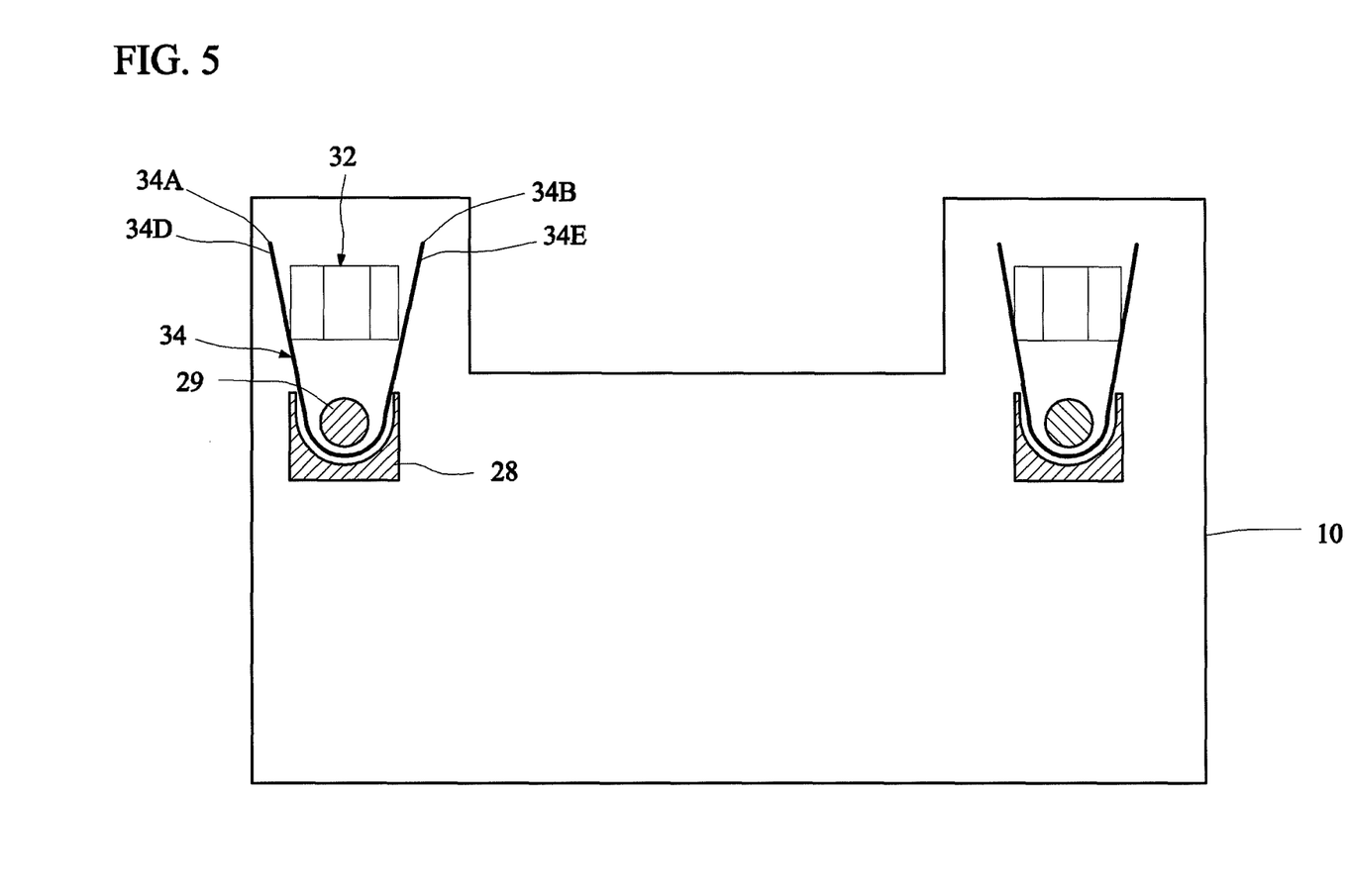
FIGS. 5 and 6 are front views respectively showing two states of another example of the interlocking mechanism according to the invention.
Figure 6:
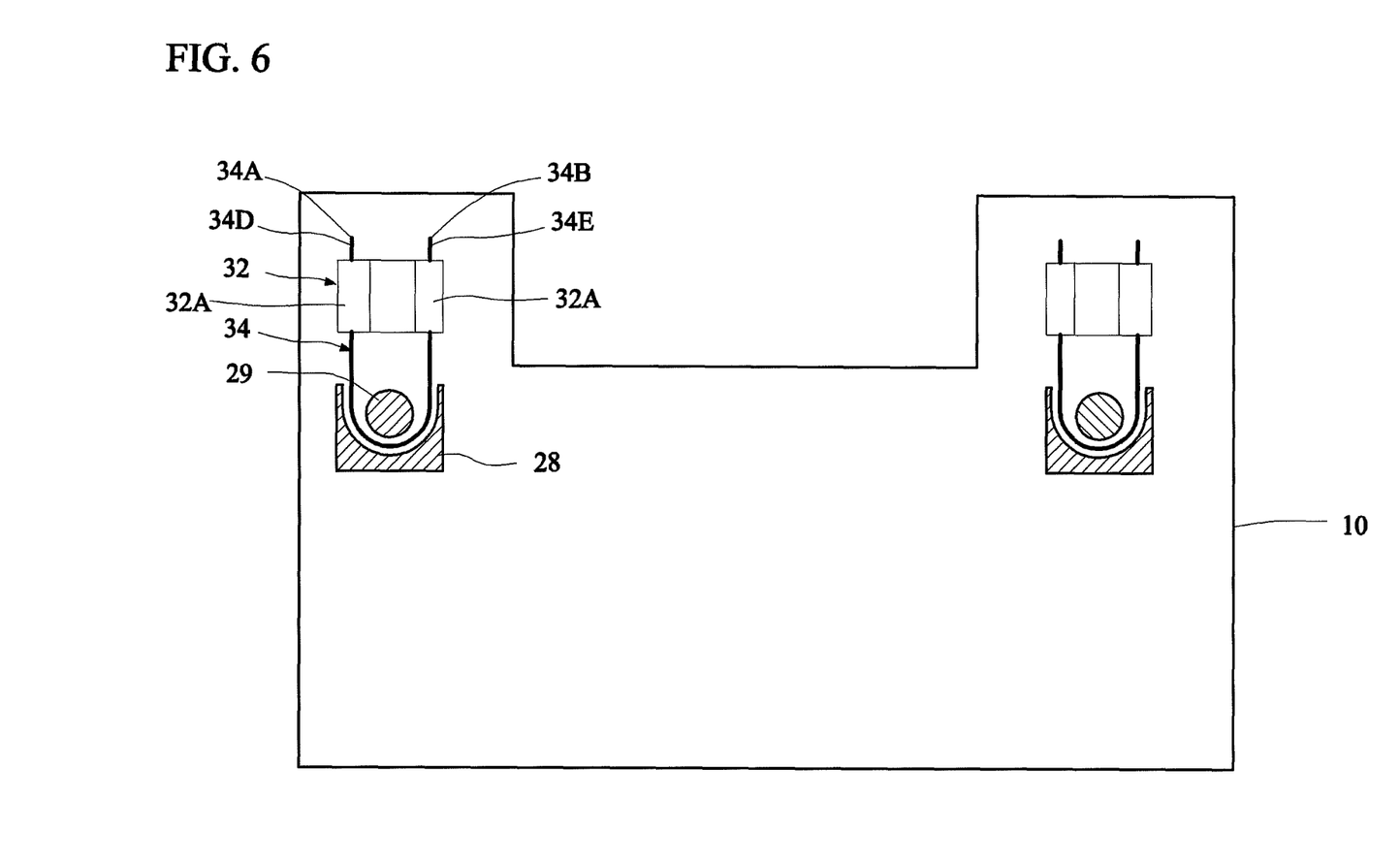

FIGS. 5 and 6 are front views respectively showing two states of another example of the interlocking mechanism according to the invention. FIG. 5 shows the deformation of the elastic member 34, as the elastic member 34 is interlocking with or disengaging from the hook 32. The hook 32 hooks the first end 34A near the first section 34D from the inner side of the elastic member 34, and the first section 34D of the elastic member 34 deforms elastically towards the outer side of the elastic member 34 in response to the force exerted by the hook 32. The hook 32 further hooks the second section 34E near the second end 34B from the inner side of the elastic member 34. The second section 34E and the first section 34D are disposed in parallel. As the hook 32 is disengaging from the elastic member 34, the first section 34D and the second section 34E deform elastically towards the outer side of the elastic member 34 in response to the forces exerted by the hook 32.

FIG. 6 shows the state when the elastic member 34 and the hook 32 are interlocked together. The first section 34D and the second section 34E of the elastic member 34 restore to their original positions through the elastic restoring forces thereof, and tightly interlock with the hook 32, so that the first body 10 and the second body 20 are fastened together.

Figure 7:
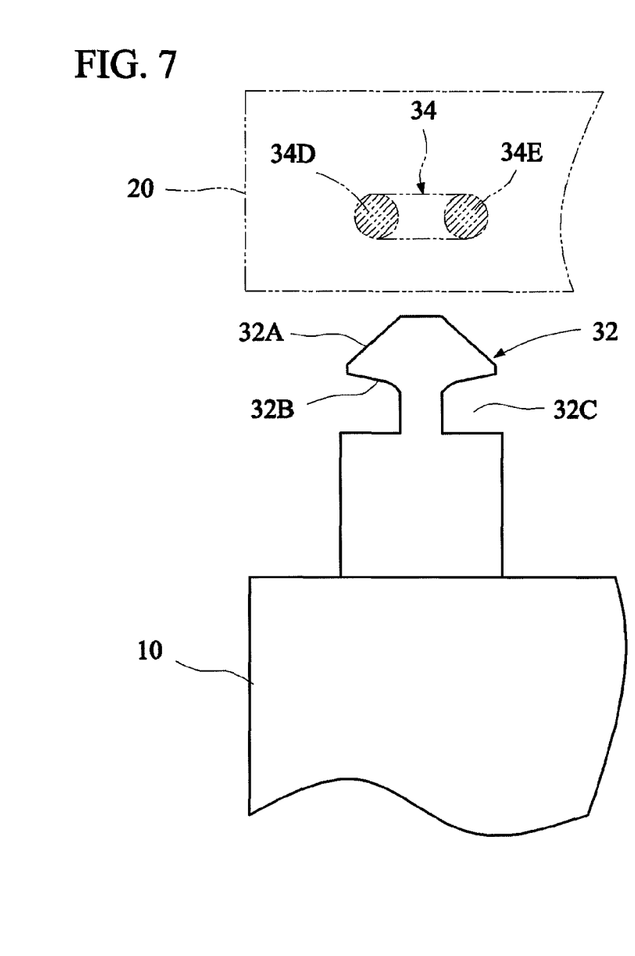
FIGS. 7 and 8 are partial side views respectively showing unlocked and locked states of the interlocking mechanism according to the invention.
Figure 8:
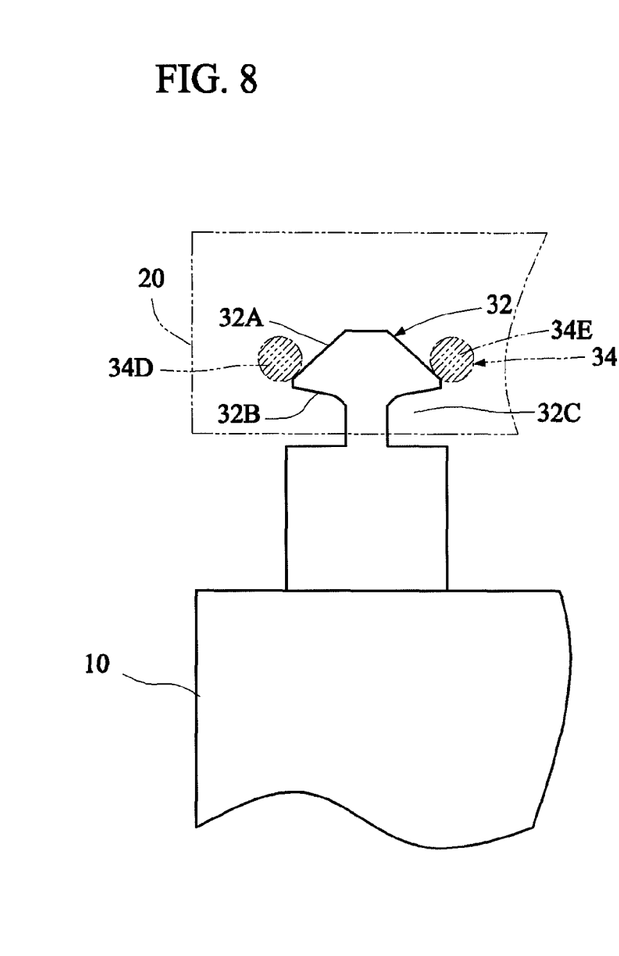
Figure 9:
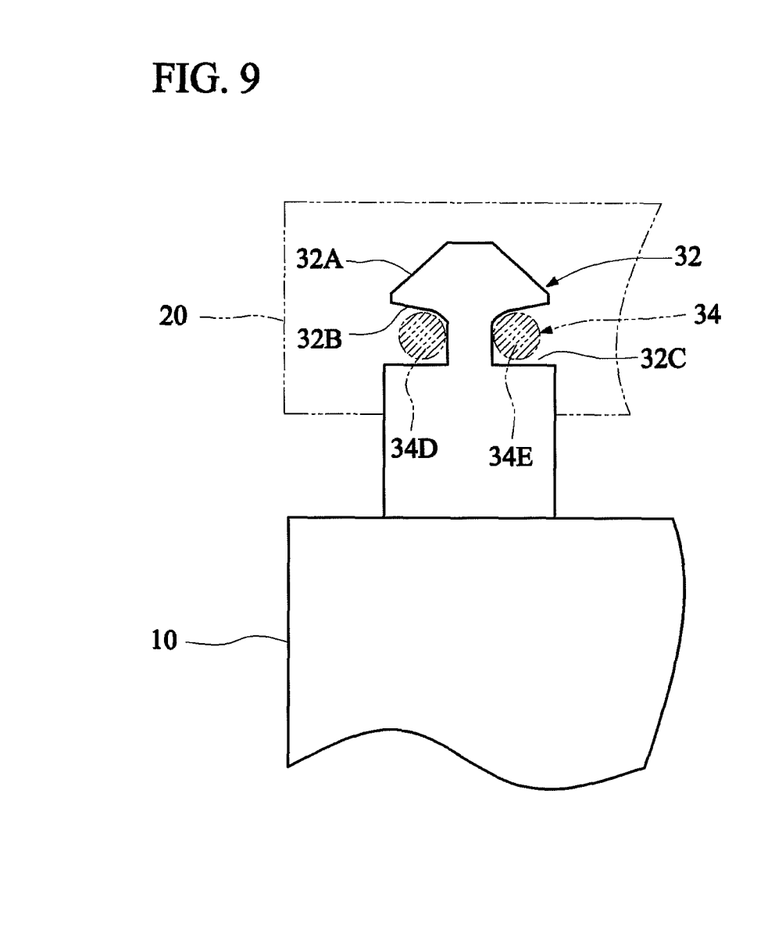
FIGS. 9 and 10 are side views respectively showing relative movements between the hook and the elastic member of the interlocking mechanism according to the invention.
Figure 10:
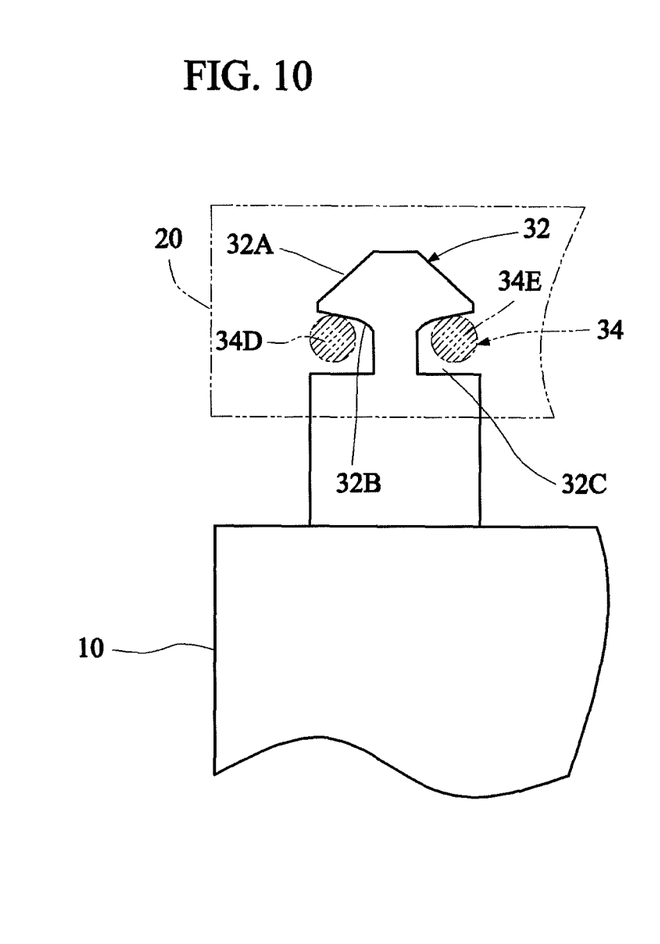

FIGS. 7 and 8 are partial side views respectively showing unlocked and interlocked states of the interlocking mechanism according to the invention. FIGS. 9 and 10 are side views respectively showing relative movements between the hook 32 and the elastic member 34 of the interlocking mechanism according to the invention. Referring to FIGS. 7 to 10, the hook 32 is formed with a first guide surface 32A, a second guide surface 32B and a groove 32C. The first guide surface 32A is an inclined surface and the second guide surface 32B is a curved surface. As the elastic member 34 and the hook 32 are interlocking with each other, the elastic member 34 deforms elastically when pressing against the first guide surface 32A. The first guide surface 32A guides the elastic member 34 into the groove 32C. The interlocking motion of the elastic member 34 and the hook 32 is as shown in the sequence of FIGS. 7, 8 and 9. As the elastic member 34 is disengaging from the hook 32, the elastic member 34 deforms elastically, and the second guide surface 32B guides the elastic member 34 out of the groove 32C. The unlocking motion of the elastic member 34 and the hook 32 is as shown in the sequence of FIGS. 9, 10, 8 and 7.

Figure 11:
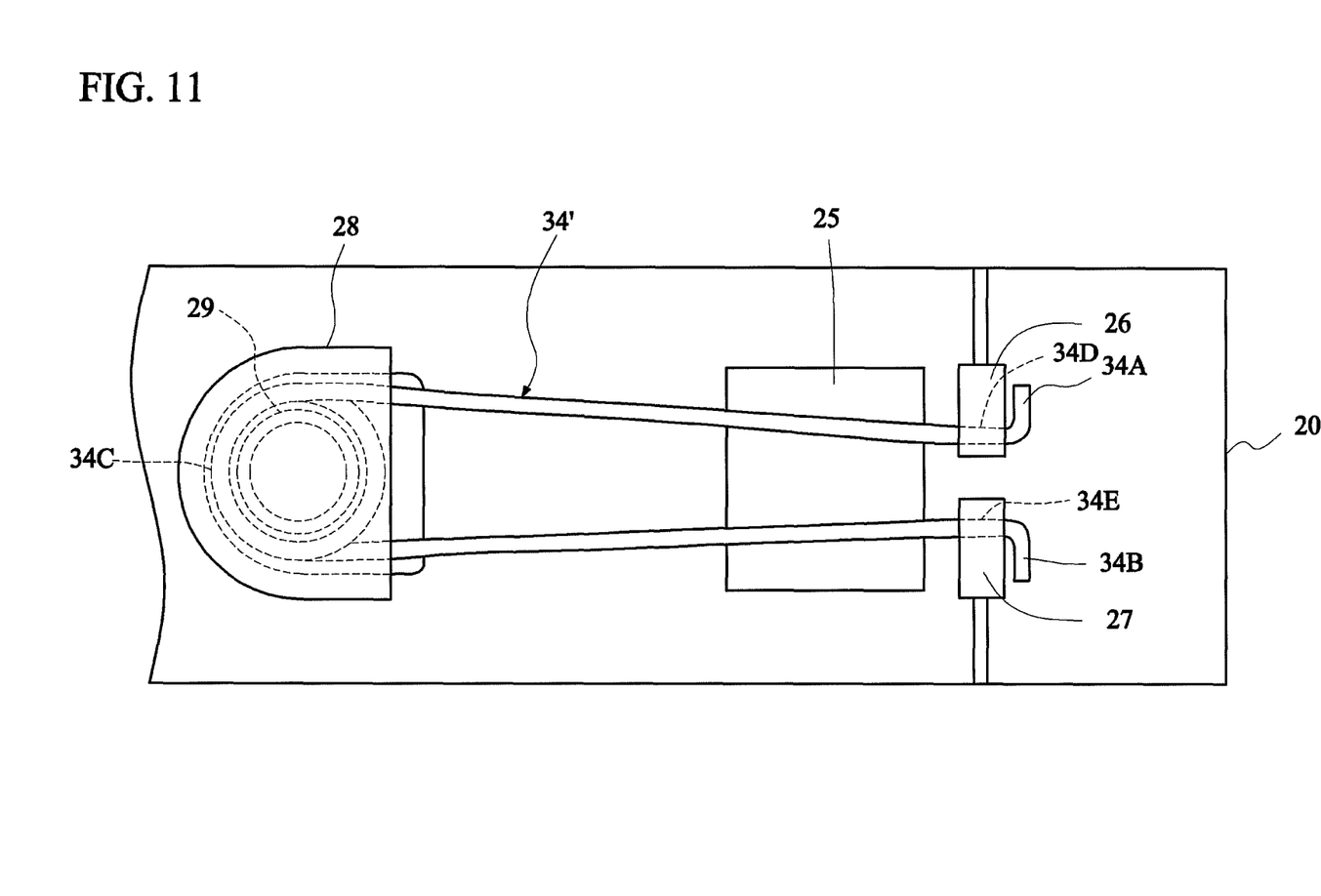
FIG. 11 is a top view showing another elastic member mounted on the second body.
Figure 12:
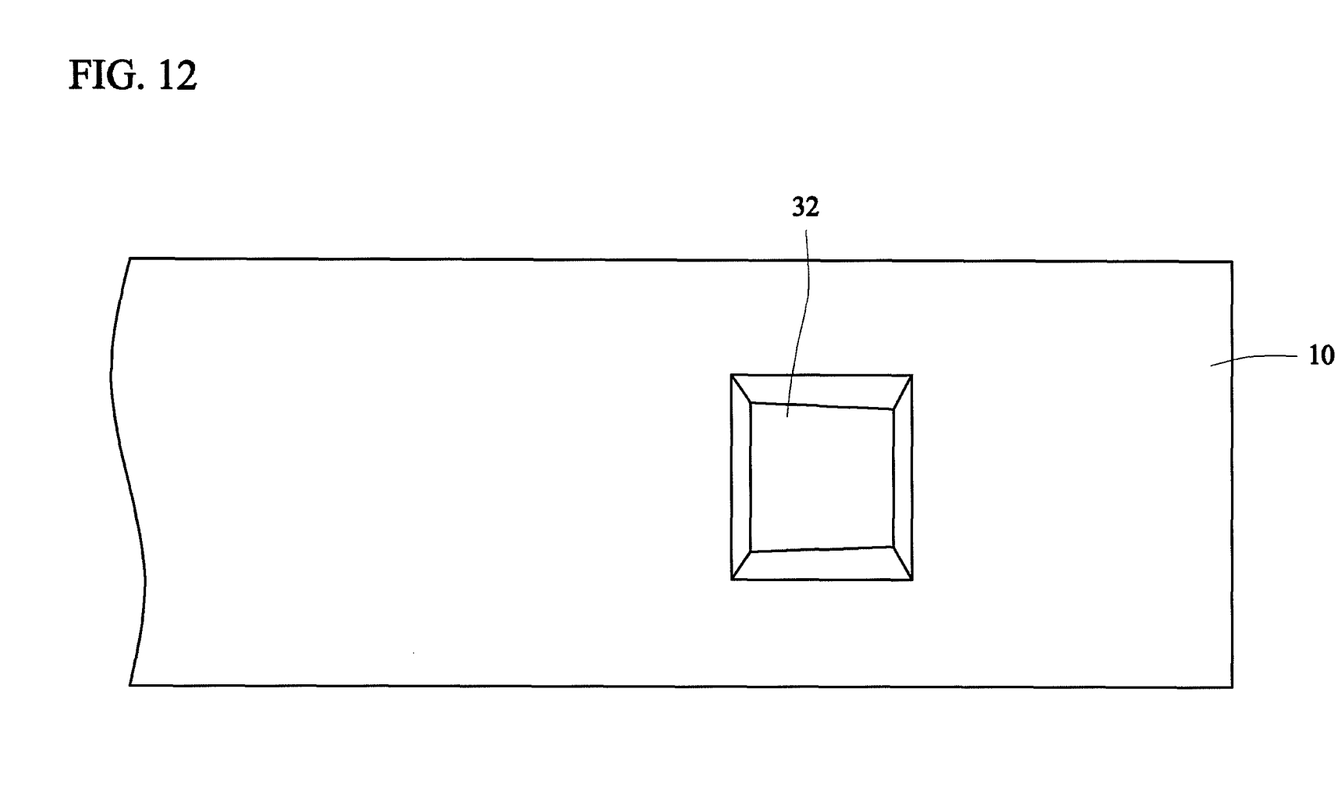
FIG. 12 is a top view showing the hook formed on the first body.
Figure 13:
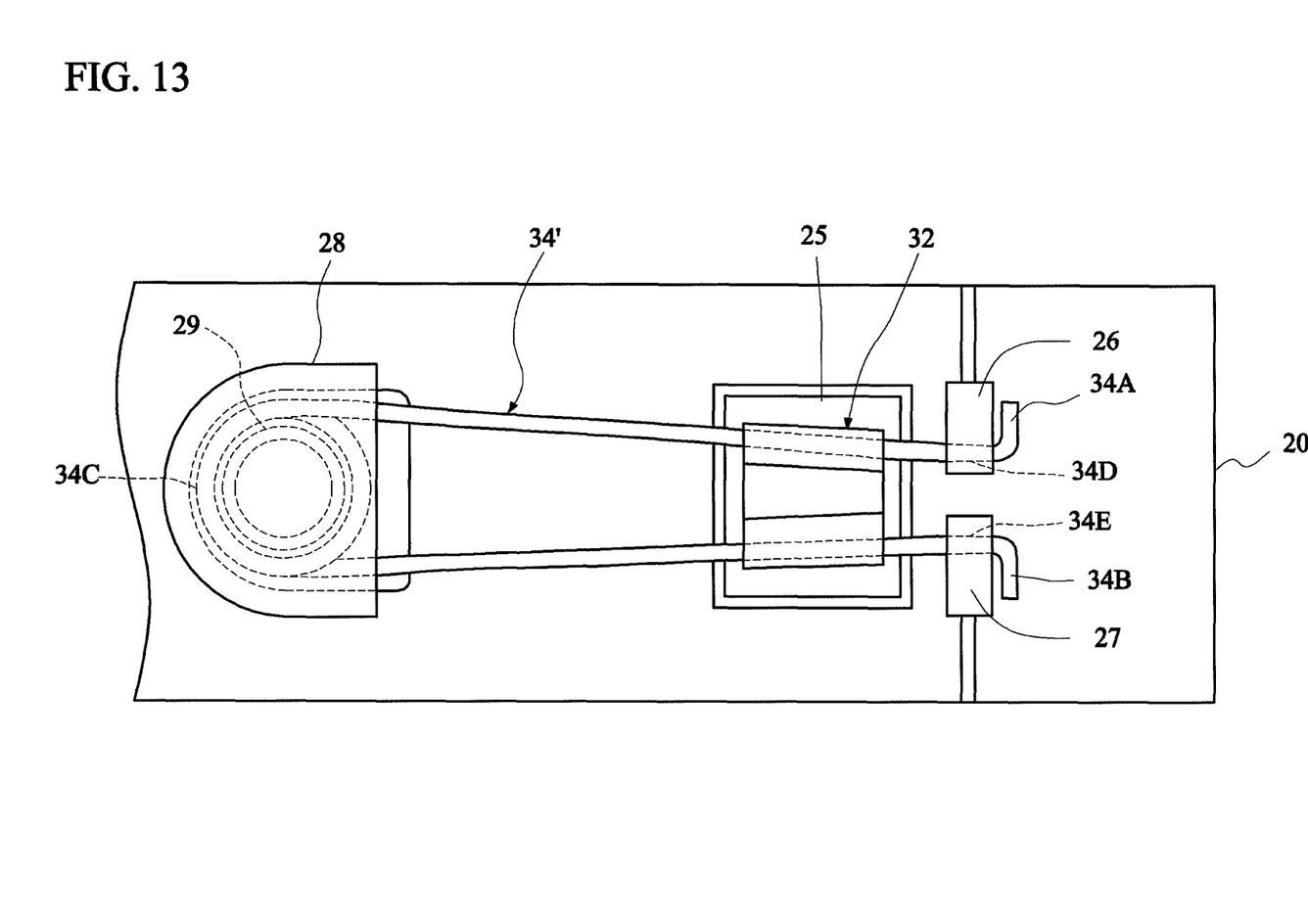
FIG. 13 is a top view showing the integration of the second body of FIG. 11 and the first body of FIG. 12.

FIG. 11 is a top view showing another elastic member 34' mounted on the second body. FIG. 12 is a top view showing the hook formed on the first body. FIG. 13 is a top view showing the integration of the second body of FIG. 11 and the first body of FIG. 12. Referring to FIGS. 11 to 13, the second body 20 is formed with an opening 25, which is positioned corresponding to the elastic member 34'. When the second body 20 is closed upon the first body 10, the hook 32 is hooked on the elastic member 34' and accommodated within the opening 25. In addition, the elastic member 34' may be a torsion spring, the first section 34D and the second section 34E are spring arms of the torsion spring, the first end 34A and the second end 34B of the torsion spring 34 are respectively positioned in retainers 26 and 27, and a loop 34C of the torsion spring is fixed to the pin 29 disposed on the second body 20. The torsion spring 34 is mounted on the second body 20 simply by attaching it to the retainers 26 and 27 and the pin 29. Even though the first section 34D and the second section 34E of the torsion spring are retained by the retainers 26 and 27, the retainers 26 and 27 still allows the first section 34D and the second section 34E to move towards or away from each other to facilitate the deformation of the elastic member 34' required during the interlocking and unlocking processes.

According to the embodiment of the invention, the elastic member 34' may be interlocked with one single side or both sides of the hook 32. The interlocking structure including the elastic member 34' and the hook 32 is simplified compared to the prior art, the number of components of the cover-type apparatus is reduced, and the lifetime of the interlocking mechanism may be lengthened by using the highly accessible metallic elastic member.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:
1. A cover-type apparatus, comprising:
a first body;
a second body; and an interlocking mechanism for fastening the second body and the first body together, the interlocking mechanism comprising:
  a hook mounted on the first body; and
  an elastic member mounted on the second body and being engageable with the hook;
wherein the elastic member deforms elastically in response to a force exerted thereon by the hook, and the elastic member deforms in a plane substantially parallel to a surface of the second body disposed opposite the first body.

2. The cover-type apparatus according to claim 1, wherein the second body is rotatably supported on the first body and the second body is openable and closable with respect to the first body.

3. The cover-type apparatus according to claim 1, wherein the elastic member is formed of metal.

4. The cover-type apparatus according to claim 1, wherein the elastic member is formed in a curved shape, wherein a first end and a second end of the elastic member are fixed to the second body.

5. The cover-type apparatus according to claim 4, wherein the hook hooks a first section near the first end from an outer side of the elastic member.

6. The cover-type apparatus according to claim 5, wherein in response to the force exerted by the hook, the first section of the elastic member deforms elastically towards an inner side of the elastic member.

7. The cover-type apparatus according to claim 4, wherein the elastic member is a torsion spring, a first section of the torsion spring near the first end and a second section of the torsion spring near the second end are spring arms of the torsion spring, each of the first end and the second end of the torsion spring is positioned in a retainer, and a loop of the torsion spring is fixed to a pin disposed on the second body.

8. The cover-type apparatus according to claim 4, wherein the hook hooks a first section near the first end from an inner side of the elastic member.

9. The cover-type apparatus according to claim 8, wherein the hook hooks a second section of the second end, disposed in parallel to the first section, from the inner side of the elastic member.

10. The cover-type apparatus according to claim 8, wherein in response to the force exerted by the hook, the first section of the elastic member deforms elastically towards an outer side of the elastic member.

11. The cover-type apparatus according to claim 1, wherein the hook is formed with a first guide surface, a second guide surface and a groove, wherein the elastic member deforms elastically when pressing against the first and second guide surfaces, the first guide surface guides the elastic member into the groove and the second guide surface guides the elastic member out of the groove.

12. The cover-type apparatus according to claim 11, wherein the first guide surface comprises an inclined surface and the second guide surface comprises a curved surface.

13. The cover-type apparatus according to claim 1, wherein the second body is formed with an opening, positioned corresponding to the elastic member, and the hook is accommodated with the opening when the second body is closed upon the first body.

14. The cover-type apparatus according to claim 1 being a scanner, wherein the apparatus further comprises:
  a scanning module disposed in the first body; and
  a sheet transporting mechanism, disposed in the first body and the second body, for transporting a document sheet past the scanning module, which captures an image of the document sheet.

15. The cover-type apparatus according to claim 14, wherein the sheet transporting mechanism comprises:
  a feeding roller mounted on the first body;
  a friction pad, mounted on the second body and in frictional contact with the feeding roller, for transporting the document sheet to a passageway between the first body and the second body; and
  two discharge rollers, respectively mounted on the first body and the second body, for transporting the document sheet out of the passageway.

* * * * *